United States Patent
Kinkelaar et al.

Patent Number: 6,051,622
Date of Patent: Apr. 18, 2000

[54] LOW RESILIENCE, LOW FREQUENCY MOLDED POLYURETHANE FOAM

[75] Inventors: Mark R. Kinkelaar, Glenmore, Pa.; Andrew M. Thompson, Hurricane; Daniel P. Krisher, South Charleston, both of W. Va.

[73] Assignee: Arco Chemical Technology, L.P., Greenville, Del.

[21] Appl. No.: 09/154,650

[22] Filed: Sep. 17, 1998

[51] Int. Cl.[7] .................................................. C08G 18/06

[52] U.S. Cl. ........................ 521/159; 521/130; 521/170; 521/174

[58] Field of Search .................... 521/130, 159, 521/170, 174

[56] References Cited

U.S. PATENT DOCUMENTS

| | | |
|---|---|---|
| 4,579,700 | 4/1986 | Cavender . |
| 4,717,518 | 1/1988 | Cavender . |
| 5,093,380 | 3/1992 | Takeyasu et al. . |
| 5,278,274 | 1/1994 | Verhelst et al. . |
| 5,300,535 | 4/1994 | Takeyasu et al. . |
| 5,470,813 | 11/1995 | Le-Khac . |
| 5,482,908 | 1/1996 | Le-Khac . |
| 5,545,601 | 8/1996 | Le-Khac . |
| 5,627,122 | 5/1997 | Le-Khac et al. . |
| 5,674,920 | 10/1997 | Obata et al. . |
| 5,712,216 | 1/1998 | LeKhac et al. . |
| 5,856,372 | 1/1999 | Ho et al. ................................. 521/159 |

FOREIGN PATENT DOCUMENTS

| | | |
|---|---|---|
| 2088521 | 8/1993 | Canada . |
| 0 480 588 A2 | 8/1992 | European Pat. Off. . |

OTHER PUBLICATIONS

J.R. Wall, General Motors Co., "Continuous Processing Of Urethane Foam Prepolymers", Chemical Engineering Progress, vol. 57, No. 10, Oct. 1961, pp. 48–51.

Mark R. Kinkelaar, K. Doug Cavender and Guy Crocco, "Vibrational Characterization of Various Polyurethane Foams Employed in Automotive Seating Applications", Polyurethanes Expo '96, pp. 496–503.

*Primary Examiner*—John M. Cooney, Jr.
*Attorney, Agent, or Firm*—Brooks & Kushman P.C.

[57] ABSTRACT

Molded polyurethane seating foams exhibiting low resonant frequencies and low ball rebound are produced by reacting an isocyanate-terminated prepolymer prepared from a polyol component comprising in major part one or more low intrinsic unsaturation substantially polyoxypropylene polyols and/or polymer polyols with a blowing/chain extending stream comprising water and optionally amines and alkanolamines.

25 Claims, 1 Drawing Sheet

LOW RESILIENCE, LOW FREQUENCY MOLDED POLYURETHANE FOAM

TECHNOLOGICAL FIELD

The present invention pertains to low ball rebound, low resonant frequency polyurethane foams and to formulations suitable for their preparation. Such foams are useful in dynamic seating applications, and are prepared by introducing a low intrinsic unsaturation isocyanate-terminated prepolymer and a blowing and chain-extending water stream into a mold and allowing the reactive system to foam and cure.

DESCRIPTION OF THE RELATED ART

Molded polyurethane foams have achieved dominance in vehicular seating cushions. Tenets of modern vehicle design dictate the minimization of component weight and cost. As vehicular seating represents both significant weight and cost, it is not surprising that long-standing efforts have been made to lighten such components, and if possible reduce their cost, while maintaining or improving passenger comfort.

In the past, composite vehicular seating having a spring suspension and a molded polyurethane foam cushion has been commonplace. However, the desire to further reduce weight while also enhancing recyclability of vehicle components has led designers to consider "deep foam" or "full foam" designs wherein the spring suspension is eliminated. In spring suspension composite seating, both the spring suspension as well as the foam cushion are useful in isolating the passengers from vehicle vibration, whether induced by the vehicle itself, i.e. engine vibration, or by its travel over the road surface. Elimination of the spring suspension requires the foam pad itself to absorb or attenuate all the physiologically active vibrations, especially those in the range of 6 Hz to 20 Hz. A discussion of these problems and the applicability of three urethane molded foam systems, TDI HR, TDI hot cure, and MDI HR, in absorbing/attenuating vibration is well documented in M. Kinkelaar, K. D. Cavender, and G. Crocco, "Vibrational Characterization Of Various Polyurethane Foams Employed In Automotive Seating Applications", Polyurethanes Expo '96 conference proceedings, Polyurethane Division, SPI, pp. 496–503 (1996), herein incorporated by reference.

According to Kinkelaar et al., in-vehicle seating comfort is improved with reduction in vibration transmission of the foam or seat in the 6–20 Hz region. Generally, laboratory vibration testing of seating foam does not accurately predict the absolute in-vehicle performance of that foam. However, studies indicate that foam vibration testing does correlate with in-vehicle comfort, and foams with lower natural frequencies in laboratory testing tend to provide improved vibration control in the vehicle. Generally, laboratory vibration test results for seating foam are somewhat test-method specific. The test methods employed herein are described in more detail in the specification.

Typical output from a laboratory vibration test is a plot of transmissivity versus frequency, where transmissivity is defined as response peak acceleration (A) divided by input peak acceleration ($A_o$). The most common plot contains three distinct regions. At very low frequencies (Region 1), $A/A_o=1$, and response vibration equals input vibration. At higher frequencies (Region 2), the response vibration exceeds the input vibration ($A/A_o>1$). For the test method used herein, the response vibration peaks at the natural frequency. At even higher frequencies (Region 3), the response vibration and the value of $A/A_o$ dip below 1. Region 3 is the "attenuation" region. It is the attenuation properties that are of most interest to those skilled in the art.

As is also known in the art, natural frequency is inversely related to ball rebound. In other words, foams with high ball rebound tend to have lower natural frequencies, and vice versa. The automotive seat industry recognizes that a low natural frequency is needed for good vibrational comfort in a full-foam seat. Therefore, high ball rebound foam is generally specified for full-foam seating applications. However, high ball rebound can introduce other problems. For example, when road input vibration is near the natural frequency of the automotive seat, this vibration is amplified, which leads to passenger discomfort and potential safety concerns.

The trends discussed by Kinkelaar et al. are also evidenced by the patent literature. In U.S. Pat. No. 5,093,380, for example, low frequency molded foams having resonant frequencies less than 4 Hz are prepared by the one-shot reaction of a di- or polyisocyanate with a relatively high molecular weight polyoxyethylene-capped polyoxypropylene polyol, i.e. one having a hydroxyl number of 5 to 38, which also have an unsaturation $y \leq 0.9/(x-10)$ where x is the hydroxyl number. This relationship corresponds to unsaturations less than 0.9 at a hydroxyl number of 11, to 0.032 at hydroxyl number of 38. Thus, the patent would appear to indicate that when higher molecular weight polyols are utilized, greater unsaturation can be tolerated. Unsaturations in the range of 0.020 to 0.026 are exemplified. Consistent with Kinkelaar et al., the ball rebound values of these foams are high, minimally about 70 and averaging 80, to achieve resonant frequencies below 4 Hz. Similar one-shot foams (TDI HR) prepared from higher unsaturation polyols exhibited slightly higher resonant frequency (4.0 to 4.3 Hz) and somewhat lower resiliency, but produced poor quality foam.

U.S. Pat. No. 5,300,535 is similar in some respects to U.S. Pat. No. 5,093,380, in teaching that high ball rebound is necessary to obtain good vibrational attenuation properties. However, U.S. Pat. No. 5,300,535 discloses a problem associated with the use of low unsaturation polyols due to their higher than normal viscosity. Due to the higher viscosity, mixing of the polyol component with the isocyanate component is stated to be difficult. U.S. Pat. No. 5,300,535 solves this problem by diluting the polyol with a polymerizable unsaturation monomer such as a (meth) acrylate. However, the use of such monomers is not desired in manufacturing environments. Like U.S. Pat. No. 5,093,380, very low resonant frequencies and high ball rebound foams are disclosed.

In U.S. Pat. No. 5,674,920, numerous problems association with low resonant frequency foams are addressed. According to the '920 patentees, high resiliency and low compression set are required. The solution to this problem was achieved through use of polyphenylene polymethylene polyisocyanates having specific higher ring content, in conjunction with polyols having a monol content of less than 15 mol percent and an oxypropylene moiety head to tail selectivity in excess of 96 mol percent. Unfortunately, such isocyanate mixtures must be separately manufactured or blended, and the very specific polyols may only be produced by base catalyzed oxyalkylation at low temperatures. Due to the low temperature, production of such polyols requires a considerable cost premium. The '920 patent discloses a conventional prepolymer technique where the resin side is a mixture of conventional polyether and polymer polyols with only a minor amount of water in the B-side as a blowing agent. Foams prepared from both the claimed compositions as well as the comparative compositions had high resiliency, on average.

It would be desirable to provide polyurethane molded foams which display low resonant frequencies and which exhibit superior vibrational characteristics than TDI HR, TDI hot cure, and MDI HR technologies currently used for automotive seating foam. It would further be desirable to produce foams of low resonant frequency and high attenuation while avoiding the use of unsaturated diluents, and without requiring isocyanate compositions and polyols which are not readily available or whose preparation is not cost effective.

SUMMARY OF THE INVENTION

It has now been surprisingly discovered that seating foams having excellent vibration absorbing/attenuating qualities can be prepared from low intrinsic unsaturation isocyanate-terminated prepolymers and a curing stream comprising water in major mol part, and optionally an amine, the isocyanate index, foam density, and other vibration and attenuation-affecting parameters being maintained such that the resilience of the foam, measured by ball rebound, is less than 70%, and the resonant frequency is less than about 7 Hz as measured by the test method described herein. The resulting foams not only exhibit low resonant frequency, but also exhibit superior vibration control as compared to one-shot foams.

DESCRIPTION OF THE PREFERRED EMBODIMENTS

Figure 1:
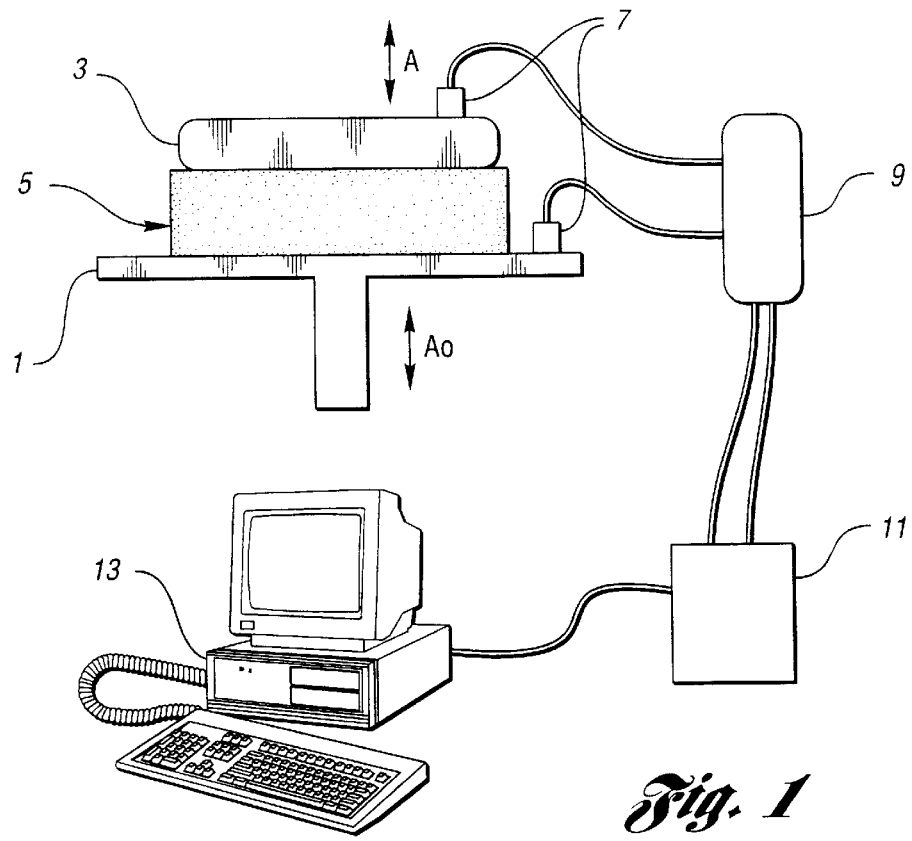
FIG. 1 is a schematic of the test method used to measure resonant frequency of polyurethane foams.

The polyurethane foams of the present invention are low resonant frequency, low ball rebound polyurethane flexible molded seating foams. The subject foams are suitable for dynamic seating applications for which attenuation of transmitted vibrational energy is desired. By "low resonant frequency" is meant a resonant frequency below about 7 Hz, preferably in the range of 2–6 Hz. By "low ball rebound" is meant that the ball rebound, as measured by ASTM D3574, is less than about 70%. Ball rebound is preferably lower than 65%, and more preferably in the range of 50–60%.

The polyurethane molded foams of the present invention are prepared by the water/amine chain extension of one or more low intrinsic unsaturation isocyanate-terminated prepolymers. By the term "low intrinsic unsaturation" with respect to the isocyanate-terminated prepolymers is meant that the prepolymers are prepared by reacting a stoichiometric excess of di- or polyisocyanate with a low intrinsic unsaturation polyol. By "low intrinsic unsaturation polyol" is meant a polyoxyalkylene polyol or mixture thereof, preferably a predominantly oxypropylene moiety-containing polyol, which has an average unavoidable or "intrinsic" unsaturation of less than 0.025 meq/g. The intrinsic unsaturation is preferably less than 0.020 meq/g, more preferably less than 0.015 meq/g, and most preferably below 0.010 meq/g, i.e. in the range of 0.002 to 0.008 meq/g. "Intrinsic" unsaturation is to be distinguished from "induced" unsaturation, i.e. unsaturation which is purposefully added to a polyol during or following its preparation to provide sites of reactive unsaturation necessary for preparing polymer polyols. Preparation of polyols with low intrinsic unsaturation is within the level of skill in the art. Preparation is preferably effected using double metal cyanide catalysts such as those disclosed in U.S. Pat. Nos. 5,470,813; 5,482,908; 5,712,216; 5,627,122; and 5,545,601.

The polyol component used to prepare the low intrinsic unsaturation prepolymers of the subject invention may contain one or more polyols and may, in addition, contain chain extenders, i.e. isocyanate-reactive low molecular weight compounds and oligomers, preferably aliphatic glycols and polyoxyalkylated glycol oligomers having molecular weights below about 1000 Da. However, the major portion of the polyol component, by weight, must consist of polyoxyalkylene polyols having equivalent weights in excess of 1000 Da, preferably in the range of 1500 Da to 5000 Da, and more preferably in the range of 1800 Da to 3000 Da. It is important that the average unsaturation of the polyol component, as measured by ASTM D-2849-69, "Testing Of Urethane Foam Polyol Raw Materials", be 0.025 meq/g or less, more preferably 0.020 meq/g or less, and most preferably about 0.015 meq/g or less.

In place of measuring the actual unsaturation of the polyol component, the unsaturation may be calculated from the measured unsaturations of the component polyols. In these calculations, polyols and chain extenders having equivalent weights of less than 500 Da may be neglected.

The majority of the polyols in the polyol component having equivalent weights in excess of 1000 Da should consist of low intrinsic unsaturation polyols, preferably polyols having unsaturation of less than 0.015 meq/g, and more preferably less than 0.010 meq/g. As indicated previously, the overall intrinsic unsaturation of the polyol component must not exceed 0.025 meq/g, and is preferably lower. Most preferably, the polyols employed which have equivalent weights greater than 1000 Da are prepared by double metal cyanide complex catalyzed oxyalkylation. Preferred polyols have head to tail selectivities of less than 96%, advantageously less than 90%.

By the term "predominantly oxypropylene moiety-containing" and like terms is meant that greater than 50 weight percent of that portion of the polyol component consisting of polyols with equivalent weights of greater than 1000 Da be oxypropylene moieties. Preferably, each polyol present in substantial quantity in the polyol component should contain in excess of about 50 weight percent oxypropylene moieties, more preferably greater than 65 weight percent. Preferably, oxyalkylene moieties other than oxypropylene moieties are oxyethylene moieties, present internally in block, random, or block random fashion, or externally as a homopolyoxyethylene block or a copolymer block. Other oxyalkylene moieties such as 1-oxypropylene (derived from oxetane), oxybutylene (derived from 1,2-butylene oxide and/or 2,3-butylene oxide) and other oxyalkylene moieties such as those derived from styrene oxide and halogenated alkylene oxides are also suitable. Preferably, all oxyalkylene moieties are either propylene oxide or ethylene oxide. Most preferably, when the low intrinsic unsaturation polyols are prepared by double metal cyanide catalyzed oxyalkylation, any substantial polyoxypropylene block will contain minimally about 1.5 weight percent random oxyethylene moieties.

The isocyanate components useful in preparing the isocyanate-terminated prepolymers of the subject invention include the known aromatic and aliphatic di- and polyisocyanates, for example 2,4- and 2,6-toluenediisocyanates and mixtures thereof (TDIs), 2,2'-, 2,4'- and 4,4'-methylene diphenylene diisocyanates and mixtures thereof (MDIs), polymethylene polyphenylene polyisocyanates (PMDIs), 1,6-hexanediisocyanate, isophoronediisocyanate, and mixtures of such isocyanates. Other isocyanates may be used as well. Also suitable are the so-called modified isocyanates prepared by reacting a di- or polyisocyanate with an isocyanate-reactive monomer or oligomer or with itself. Examples are urethane-modified isocyanates prepared by reacting a di- or polyisocyanate or mixture thereof with one or more glycols, triols, oligomeric polyoxyalkylene diols or polyols or mixtures thereof; urea modified isocyanates prepared by reacting the isocyanate with a diamine or amino-terminated polyoxyalkylene polyether oligomer; and carbodiimide, polyisocyanurate, uretonimine, allophanate and uretdione modified polyisocyanates prepared by reacting the isocyanate or modified isocyanate with itself in the presence of a suitable catalyst. Such isocyanates and modified isocyanates are well established items of commerce. Particularly, preferred di- and/or polyisocyanates include TDIs, MDIs, PMDIs and mixtures of these, particularly mixtures of TDIs and MDIs, the latter preferably containing a substantial majority of the 4,4'-isomer.

The prepolymers of the subject invention are prepared in the conventional manner by reacting the polyol component with the isocyanate component with or without urethane promoting catalysts, as described, for example, in the POLYURETHANE HANDBOOK, Gunter Oertel, Hanser Publishers, Munich© 1985, and POLYURETHANES: CHEMISTRY AND TECHNOLOGY, J. H. Saunders and K. C. Frisch, Interscience Publishers, New York, 1963, and in U.S. Pat. No. 5,070,114, herein incorporated by reference. Continuous and batch processes for the preparation of isocyanate-terminated prepolymers are disclosed in "Continuous Processing of Urethane Foam Prepolymers", J. R. Wall, CHEMICAL ENGR. PROGRESS, V. 57, No. 10, pp. 48–51; Sanders, op.cit., Part II, pp. 38–43; U.S. Pat. No. 5,278,274; European published application EP 0 480 588 A2; and Canadian Patent No. 2,088,521.

The prepolymers of the subject invention have a free isocyanate (NCO) group content of from 5 weight percent to 35 weight percent, preferably 6 weight percent to 25 weight percent, and advantageously 8 to 20 weight percent.

The isocyanate-terminated prepolymers comprise the A-side (iso side) of the molded polyurethane foam system. The B-side (resin side) of the subject invention molded polyurethane foam system employs isocyanate reactive components, blowing agent(s), surfactant(s), and other additives and auxiliaries, for example chain extenders, cross-linkers, catalysts, dyes, pigments, fillers, etc. Additives which are not reactive with isocyanates may be added to the A-side of the formulation.

Catalysts are generally necessary. The catalysts may be selected from conventional urethane-promoting catalysts, for example, tin catalysts such as dibutyltin diacetate, dibutyltin dilaurate, stannous octoate, and the like; amine catalysts such as NIAX®A-1, diethylene triamine, 1,4-diazabicyclo[2.2.2]octane, and the like. Mixtures of metal catalysts and amine catalysts may be used as well. Preferred are amine catalysts. Amounts of catalysts may be readily determined by one skilled in the art, and may range, for example, from 0.1 to 5 weight percent based on the weight of the foam.

Suitable chain extenders include the various alkylene glycols and oligomeric polyoxyalkylene glycols with molecular weights up to about 300 Da, for example ethylene glycol, propylene glycol, 1,4-butanediol, 1,6-hexanediol, diethylene glycol, dipropylene glycol, tripropylene glycol, and the like. The amount of chain extender may be adjusted to provide the necessary processing or physical parameters of the foam. Preferably, only most minor amounts of chain extenders are used, for example less than 10% by weight and preferably less than 5% by weight relative to foam weight. Amino-functional chain extenders such as aliphatic diamines, MOCA, toluene diamine, and hindered aromatic amines may also be suitable.

Suitable cross-linkers include polyhydroxyl functional monomeric compounds such as glycerine, but preferably alkanolamines such as monoethanolamine, diethanolamine (DEOA) and triethanolamine (TEOA). As with the chain-extenders, cross-linkers, when used, are preferably used in most minor amounts, for example less than 10 weight percent and most preferably less than 5 weight percent relative to total foam weight. Both chain extenders and cross-linkers, when used, are preferably dissolved in water which serves as the blowing agent.

A cell-stabilizing surfactant is generally required. Suitable cell-stabilizing surfactants include the various organopolysiloxanes and polyoxyalkylene organopolysiloxanes as are well known to those skilled in the art. Suitable surfactants include DC5043 available from Air Products, and Y-10,515 available from Witco. Additional surfactants are available from Wacker Silicones, Adrian, Mich., and Goldschmidt A. G., Germany. Combinations of surfactants may also be used, for example, a blend of Tergitol 15-S-9 available from the Union Carbide Corporation and DC5043. The amount of surfactant should be an amount effective to avoid foam collapse, and is readily ascertained by one skilled in the art. Amounts of from 0.1 to about 5 weight percent, preferably 0.5 to 2 weight percent based on the weight of the foam may be suitable.

The B-side may further contain polyoxyalkylene polyols and/or polymer-modified polyoxyalkylene polyols wherein the polyols have molecular weights of c.a. 300 Da or higher, preferably equivalent weights of from 500 to 5000, more preferably 1000 to 3000. The B-side may contain up to 30 weight percent of such polyols, but preferably no more than 20%, more preferably less than 10%. Most preferably, the prepolymer contains in excess of 90% of total polyol, and in particular virtually all polyol. For the same reason, high primary hydroxyl content is not necessary for any B-side polyol. However, B-side polyols may advantageously contain greater than 50 mol percent, and more preferably greater than 70 mol percent primary hydroxyl groups. Preferably, no additional polyoxyalkylene polyol is contained in the B-side formulation.

The B-side contains water or another blowing agent of the chemical type. The preferred blowing agent is water, which reacts with isocyanate to generate urea linkages with concomitant release of carbon dioxide gas. Physical blowing agents may also be used in conjunction with water. Non-limiting examples of additional blowing agents include the lower alkanes, e.g., butane, isobutane, pentane, cyclopentane, hexane, and the like; the chlorofluorocarbons (CFCs), e.g. chlorotrifluoromethane, dichlorodifluoromethane, and the like; the hydrochlorofluorocarbons (HCFCs) such as fluorodichloromethane and chlorodifluoromethane; the perfluorinated $C_3$–$C_8$ aliphatic and cycloaliphatic hydrocarbons (PFCs) and substantially fluorinated analogous (HPFCs); chlorinated hydrocarbons such as methylenedichloride, liquid $CO_2$, and the like. CFC's are preferably avoided due to environmental concerns. As stated previously, the preferred blowing agent is water, which is most preferably used as the sole blowing agent. Frothing agents such as $CO_2$, nitrogen, and air may be introduced as well.

The amount of blowing agent is selected so as to provide a foam density of from about 1.0 lb/ft³ or less to 4.0 lb/ft³ or more, more preferably 1.0 lb/ft³ to 3.0 lb/ft³, and most preferably about 1.2 lb/ft³ to about 2.8 lb/ft³. Amounts of water ranging from 1.0 part to 5.0 parts per 100 parts foam formulation ingredients, preferably 2.0 parts to about 4.5 parts are especially preferred.

The A-side and B-side are combined in conventional fashion employing a low pressure or high pressure mix head and introduced into the mold which is optionally and preferably maintained above ambient temperature. The mold temperature may be maintained at a temperature suitable for either hot or cold molding. The mold may be closed, with foam forming ingredients introduced into a suitable charging port, or may be an open mold which is closed following introduction of the foam formulation. The term "closed mold" includes both types as well as any variants. The cells in the molded foam are opened prior to demolding by timed-pressure release (TPR) as disclosed in Cavender U.S. Pat. Nos. 4,579,700 and 4,717,518, and/or by crushing after demolding, followed by curing in the conventional manner. It has been surprisingly discovered that not only do the foam formulations of the subject invention process well, but moreover, the foams are of superior quality as compared to conventional foams from similar systems not employing low intrinsic unsaturation polyols. Moreover, these results are achievable from polyols independent of primary hydroxyl content normally required to produce molded foam.

In a preferred embodiment of the subject invention process, a four-stream configuration is used at the mix head. One stream comprises the activator stream, and preferably constitutes a major portion of water, optionally containing surfactant(s), catalyst(s), amines, alkanolamines, and traditional polyurethane additives. A second stream comprises an isocyanate stream, and may contain one or more conventional modified or unmodified isocyanates. A third stream constitutes a low (or no) solids isocyanate-terminated prepolymer stream, generally prepared, as indicted previously, by reaction of a low intrinsic unsaturation polyol with excess isocyanate, with no or little polymer polyol contained in the polyol component; and a fourth stream comprises a "high" solids prepolymer, prepared as previously indicated, but with appreciable polymer polyol solids.

By use of this four-stream process, a wide variety of foams can be prepared. In particular, load building through addition of isocyanate can be effectively practiced. The preferred compositional ranges of each stream are listed in the table below. All amounts are in parts by weight relative to the total weight of each individual stream.

TABLE 1

| Component | Stream 1 (Activator Stream) | Stream 2 (Isocyanate Stream) | Stream 3 (Low Solids Prepolymer Stream) | Stream 4 (High Solids Prepolymer Stream) |
|---|---|---|---|---|
| Polyoxyalkylene Polyol | | | 75–100 | 0–50 |
| Polymer Polyol | | | 25–0 | 100–50 |
| Isocyanate | | 100 | 10–50 | 10–50 |
| Surfactant | 0–3 | 0–3 | 0–3 | 0–3 |
| Water | 2–6 | — | — | — |
| Catalyst(s) | 0–2 | 0–1 | 0–1 | 0–1 |
| Other | 0–5 | 0–5 | 0–5 | 0–5 |

By merely changing the ratio of the various streams, a large variety of foams may be produced, including a vast array of molded foam useful for automotive seating, particularly foam with a density in the range of 20–70 kg/m³, and firmness in the range of 1–14 kPa (50% CFD).

In another preferred embodiment, two isocyanate-functional streams are supplied to a mix head and two water streams, the latter containing catalysts, crosslinkers, etc., with one water stream optimized for low density foam applications and the other water stream optimized for high density applications. The isocyanate-functional streams include one having a high polymer content, i.e., comprises one or more isocyanate-terminated prepolymers, while the second isocyanate-functional stream has a lower polymer content, i.e., is a high NCO-content prepolymer, a quasi-prepolymer, or a high or low NCO-content prepolymer in admixture with unreacted di- or polyisocyanate. The first isocyanate-functional stream also generally contains a substantial amount of polymer polyol, while the second isocyanate-functional stream contains little or no polymer polyol. By use of the "prepolymer" isocyanate-functional streams, the solids and isocyanate content may simply be adjusted by changing the ratio of these streams relative to each other. For example, a high relative proportion of the low solids (high isocyanate) stream relative to the high solids stream might be used in conjunction with one water catalyst stream optimized for high density applications to prepare automotive molded seat cushions, while a higher relative proportion of the higher solids (low isocyanate) stream might be used with a second water/catalyst stream to prepare low density seat backs. In the past, switching from a higher density, higher hardness foam to a lower density, softer foam has required wholesale changes to the streams supplied to the mix head. In the process of the subject invention, these changes in production can be accommodated simply by changing the ratio of high solids/little or no solids isocyanate streams, optionally in conjunction with selecting a different optimized water/catalyst stream or changing the ratio of water/catalyst streams.

Thus, the subject invention also provides a process for the flexible production of various types of molded polyurethane foams from a single mixhead without changing mixhead reactive component supply, by supplying at least one first activator stream comprising a major molar proportion of water and polyurethane-promoting catalyst; and optionally an alternative first activator stream comprising a major molar proportion of water and polyurethane-promoting catalyst, said first activator stream different from said secondary first activator stream; and at least two and optionally three isocyanate-functional streams: a second, isocyanate stream comprising one or more di- or polyisocyanates; a third, low solids prepolymer stream having a low dispersed phase polymer solids content, preferably in the range of 0 weight percent to about 10 weight percent; and a fourth, high solids prepolymer stream having a higher dispersed phase polymer solids content, for example in the range of 15 weight percent to 60 weight percent; selecting as molding streams at least one of said third and fourth streams, and optionally selecting also said second stream to supply isocyanate-reactive components to a mold; and selecting at least one of said first activator stream and said alternative first activator stream; mixing said molding streams; and introducing said molding streams into a mold.

Having generally described this invention, a further understanding can be obtained by reference to certain specific examples which are provided herein for purposes of illustration only and are not intended to be limiting unless otherwise specified.

In the Examples which follow, polyol A is a conventionally (base) catalyzed polyoxypropylene triol having a hydroxyl number of 31, an unsaturation of ca. 0.05 meq/g, and a 16 weight percent polyoxyethylene cap; Polyol B is a low intrinsic unsaturation triol having a hydroxyl number of 28, an unsaturation of only 0.005 meq/g, and contains 20 weight percent random internal oxyethylene moieties, of which 15 weight percent is present as a random external block having an oxyethylene to oxypropylene weight ratio of 45:55. Polyol C is a polymer polyol prepared by the in situ polymerization of 35:65 acrylonitrile and styrene to 40 weight percent solids, in a 35 hydroxyl number conventionally catalyzed triol having an unsaturation of 0.035 meq/g and a 19 weight percent polyoxyethylene cap; and Polyol D is a polymer polyol similar to polyol C in which the base polyol is a low intrinsic unsaturation triol having a hydroxyl number of 28, an unsaturation of 0.004 meq/g and containing 20 weight percent random internal oxyethylene moieties distributed in the same manner as in Polyol B.

Figure 2:
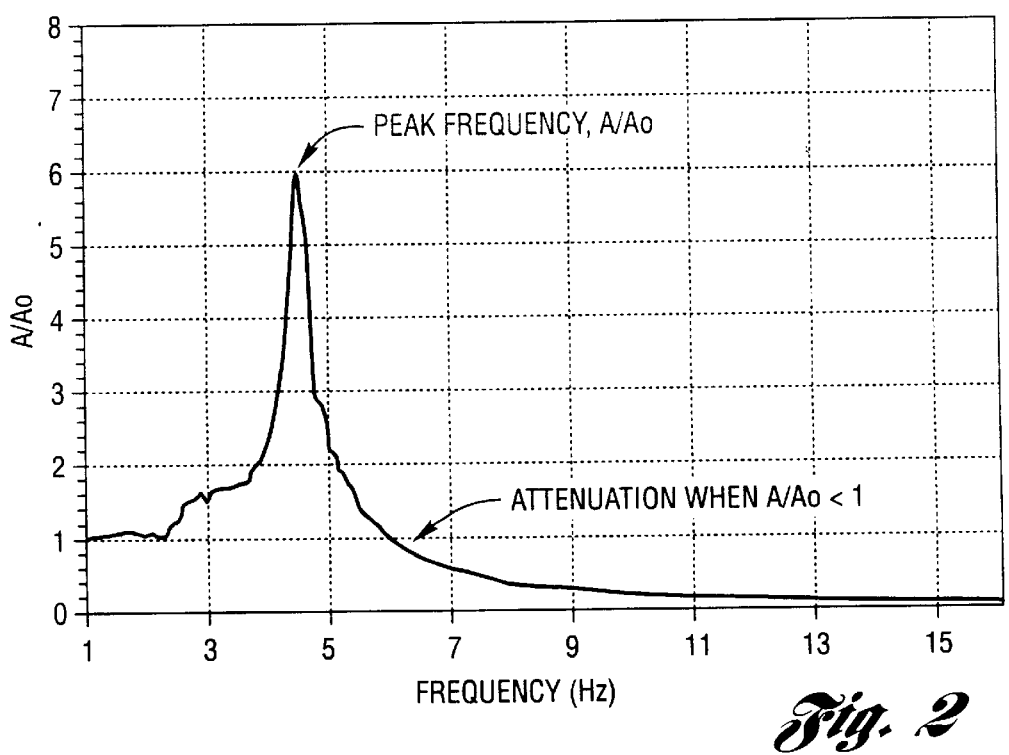
FIG. 2 is a plot of transmissivity ($A/A_o$) of a polyurethane foam.

The vibrational data presented here were determined using a laboratory scale test as depicted in FIG. 1 and an example of the data from this equipment is shown in FIG. 2. In this test the foam sample was placed on a servo-hydraulic actuated base plate 1 (MTS Corp., Minneapolis, Minn.) and a mass 3 was set freely on the foam 5. The mass was 22.7 kg and was the same diameter as a standard IFD indentor foot (200 mm). Acceleration data were measured via accelerometers 7 (PCB Piezoelectronics) powered by power supply 9 and data acquired by data acquisition module 11, and were analyzed and recorded in real time on computer 13. The servo-hydraulic actuator was programmed to perform a frequency sweep from 1 to 16 Hz in 150 seconds. During the sweep, the amplitude was decreased as the frequency increased to maintain a constant peak input acceleration ($A_o$ in FIG. 2) of 0.2 g. Transmissivity is reported as the response (A) divided by the input ($A_o$) peak acceleration, i.e.

$$Transmissivity = A/A_o.$$

A typical plot is shown in FIG. 2. This test method will not provide the in-use natural frequency of a vehicle seat assembled from the identical foam, however, this test method is a powerful tool for comparing under laboratory conditions, the vibrational responses of various foams. Thus, this test is an indication of how foams will compare in-use relative to each other.

Except where indicated otherwise, physical properties are measured by methods consistent with those generally employed in the industry. Measured in accordance with ASTM D-3574-81 "Standard Test Methods For Cellular Materials—Slab, Bonded, and Molded Urethane Foams", are the following: density (Test A); ball rebound (Test H); air flow (Test G); tensile strength and elongation (Test E); tear resistance (Test F); 50% and 75% dry set (Test D—Constant Deflection Compression Set Test); 75% humid aged compression set, "HACS", (Test J—Steam Autoclave Aging). Measurement of foam resonant frequency and transmissivity $A/A_o$ has been previously described. The properties of 25% JIS IFD, 50% Wet Set, and Hysteresis are measured by proprietary tests and are for comparison purposes only. However, these tests are similar to tests published in the literature and results are believed to be comparable to those obtained in published test methods. The 25% JIS IFD test is similar to that described in the Japanese Industrial Standard test.

Comparisons were made between conventional, one-shot TDI-based molded foam, as taught by U.S. Pat. No. 5,093,380, and the prepolymer foams of the present invention. In Examples 1–3, the polyols (polyol A and polymer polyol D) were first reacted with the isocyanate to form an isocyanate-terminated prepolymer. The formulations and physical properties of the foams are presented in Table 2 below.

TABLE 2

| | \multicolumn{6}{c}{Example:} | | | | | |
|---|---|---|---|---|---|---|
| | C1 | 1 | C2 | 2 | C3 | 3 |
| Polyol A | 51 | — | 76 | — | 76 | — |
| Polyol B | — | 55 | — | 73 | — | 73 |
| Polyol C | 49 | — | 24 | — | 24 | — |
| Polyol D | — | 45 | — | 27 | — | 27 |
| DEOA | 1.5 | 1.0 | 1.5 | 1.0 | 1.5 | 1.0 |
| Water | 2.5 | 2.6 | 3.5 | 2.6 | 4.0 | 2.6 |
| A-1 | 0.1 | 0.1 | 0.1 | 0.1 | 0.1 | 0.2 |
| A-33 | 0.3 | 0 | 0.3 | 0 | 0.3 | 0 |
| DC5043 | 1.0 | 1.0 | 1.0 | 1.0 | 1.0 | 1.0 |
| Isocyanate Index | 110 | 100 | 110 | 100 | 100 | 100 |
| Density, kg/m$^3$ | 50.8 | 50.0 | 34.5 | 35.9 | 29.9 | 29.3 |
| Ball rebound, % | 69 | 58 | 71 | 58 | 70 | 51 |
| CFD, kPa | 9.1 | 8.9 | 3.7 | 3.9 | 3.3 | 3.2 |
| Natural Frequency, Hz | 5.7 | 6.1 | 4.1 | 4.4 | 4.3 | 4.5 |

The Examples indicate that the prepolymer technique of the present invention is able to lower the ball rebound of molded foam considerably as compared to TDI-based one-shot foams employing conventional polyols with higher unsaturation. The low ball rebound obtained is considerably lower than those disclosed in U.S. Pat. No. 5,093,380, which employs low unsaturation polyols in conventional one-shot formulations.

EXAMPLES 4–6

Prepolymer-derived molded foams in accordance with the present invention were prepared from isocyanate-terminated prepolymers derived from the reaction of Polyol E, a glycerine-initiated, 24 hydroxyl number low intrinsic unsaturation polyol containing 20% oxyethylene moieties distributed in the same manner as Polyols B and D, with an 80/20 weight/weight blend of TDI/MDI. The compositions and foam physical properties are given in Table 3 below.

TABLE 3

| Components | Example 4 | Example 5 | Example 6 |
|---|---|---|---|
| Prepolymer: | | | |
| Polyol E | 100 | 100 | 100 |
| DC 5043 (Surfactant) | 0.5 | 0.5 | 0.5 |
| Coscat 83 | 0.040 | 0.04 | 0.04 |
| TDI/MDI (80/20) | 39.6 | 34.5 | 26.9 |
| Activator: | | | |
| Water | 3 | 2.8 | 2.1 |
| NIAX ® A-1 | 0.1 | 0.1 | 0.1 |
| NIAX ® A-33 | 0.2 | 0.2 | 0.2 |
| DEOA | 1.0 | 1.5 | 1.0 |
| Properties: | | | |
| Density, kg/m$^3$ | 44.3 | 51.8 | 62.0 |
| 25% JIS IFD, kg | 19 | 22 | 25 |
| Ball Rebound, % | 65 | 62 | 65 |
| Components | Example 4 | Example 5 | Example 6 |
| Natural Frequency, Hz | 4.3 | 4.4 | 4.7 |
| Peak A/A$_0$ | 4.5 | 4.9 | 4.9 |
| Air Flow, dm$^3$/s | 16.7 | 22.8 | 10.0 |
| Tensile, kPa | 92 | 89 | 82 |
| Elongation, % | 106 | 112 | 110 |
| Tear, N/m | 166 | 184 | 184 |
| 50% Dry Set, % | 4.5 | 3.3 | 3.3 |
| 75% Dry Set, % | 2.9 | 2.3 | 2.3 |

TABLE 3-continued

| 75% HACS, % | 5.4 | 6.9 | 7.6 |
| 50% Wet Set, % | 8.6 | 7.1 | 4.9 |
| Hysteresis, % | 19.5 | 16.2 | 15.7 |

As can be seen from Table 3, the use of low intrinsic unsaturation isocyanate-terminated prepolymers with a water activator stream was able to prepare molded foams having very low resonant frequencies as well as low ball rebound. The foams also demonstrated excellent 50% wet set properties.

By the term "deep foam seat devoid of spring suspension" and like terms is meant that the primary support and vibrational absorption attributes of a vehicular seat are due to the molded foam itself, without support along the bottom of the foam cushion or in its interior by springs of a metallic or composite nature. The use of spring suspension is the traditional choice for vehicular seating applications. The foam cushions of the present invention may be self-supporting through use of molded inserts or may rest on a seat pan of metal, plastic, or equivalent materials. By the term "physicochemical properties" is meant the combination of chemical properties such as polyol type, isocyanate, hard segment content, urea group content, and the like, and physical properties such as density, tensile strength, elongation, wet set, etc. By the term "polyurethane catalyst" and similar terms is meant a catalyst which promotes the formation of polyurethane foam from reactive mixtures. Such catalysts include by example but not by way of limitation, catalysts which promote reaction of hydroxyl and isocyanate groups to prepare urethane linkages; catalysts which promote reaction of water with isocyanate to generate amine and carbon dioxide (blowing catalysts), and the like.

Molecular weights and equivalent weights expressed herein in Daltons (Da) are number average molecular and equivalent weights unless indicated otherwise. All percent compositions are percent by weight unless indicated to the contrary. The term "major" when used means 50% or more by weight, or by mol when modifying the latter; similarly, "minor" means less than 50% on the same basis. Ingredients in the compositions and processes of the subject invention can be used to the exclusion of ingredients not specified, if desired. Necessary ingredients, for example, are low intrinsic unsaturation prepolymers as defined herein, a blowing agent/chain extender "activator" stream, and effective amounts of reaction promoting catalysts where required by the reactivity of the A and B sides. Use of low molecular weight unsaturated viscosity reducers is not preferred, and these may be excluded, for example. The term "resonant frequency" refers to the foam resonant frequency as determined by the methodology disclosed herein, or other methodology which yields equivalent results.

Having now fully described the invention, it will be apparent to one of ordinary skill in the art that many changes and modifications can be made thereto without departing from the spirit or scope of the invention as set forth herein.

What is claimed is:

1. A prepolymer-derived, low ball rebound, molded polyurethane foam suitable for dynamic seating applications, said foam having a resonant frequency of 7 Hz or lower, a ball rebound of less than about 70%, and a density of about 4 lb/ft$^3$ or less, and prepared by reacting, in a closed mold, a polyurethane or polyurethane/urea forming composition comprising:

a) an isocyanate-terminated low intrinsic unsaturation prepolymer prepared by the reaction of a stoichiometric excess of one or more di- or polyisocyanates with a polyol component having an average intrinsic unsaturation of less than 0.025 meq/g and comprising in major part one or more di- or higher functionality low intrinsic unsaturation polyoxyalkylene polyols having an unsaturation less than 0.025 meq/g and an equivalent weight greater than 1000 Da;

with b) an activator stream comprising water and optionally a low molecular weight amine or alkanolamine;

optionally in the presence of c) an effective amount of one or more catalysts which promote the reaction between a) and b).

2. The molded polyurethane foam of claim 1 wherein said polyol component comprises in excess of 80% by weight of one or more low intrinsic unsaturation polyoxypropylene polyols having an unsaturation of about 0.015 meq/g or less.

3. The molded polyurethane foam of claim 1 wherein said polyol component comprises in excess of 80% by weight of one or more low intrinsic unsaturation polyols having an unsaturation of about 0.010 meq/g or less.

4. The molded polyurethane foam of claim 1 wherein said ball rebound is less than about 65%.

5. The molded polyurethane foam of claim 1 wherein said ball rebound is less than 60%.

6. The molded polyurethane foam of claim 1 wherein said activator stream comprises water and diethanolamine.

7. The molded polyurethane foam of claim 1 wherein said polyol component further comprises in minor portion, one or more chain extenders or isocyanate-reactive polyoxyalkylene oligomers having a molecular weight less than 1000 Da.

8. The molded polyurethane foam of claim 1 wherein said polyol component further comprises a polymer polyol.

9. The molded polyurethane foam of claim 8 wherein said polymer polyol comprises a low intrinsic unsaturation polymer polyol.

10. The molded polyurethane foam of claim 1 wherein at least one of said one or more low intrinsic unsaturation, polyoxyalkylene polyols comprises a polyoxypropylene polyol which also contains from about 1.5 weight percent to about 30 weight percent oxyethylene moieties.

11. The molded polyurethane foam of claim 1 wherein said polyol component comprises in excess of 80 weight percent of one or more low intrinsic unsaturation substantially polyoxypropylene polyols having an unsaturation of less than about 0.010 meq/g and an oxyethylene content of less than 30 weight percent and one or more low intrinsic unsaturation polymer polyols having an intrinsic unsaturation of less than about 0.010 meq/g such that said polyol component has an average unsaturation not greater than about 0.015 meq/g; wherein said activator stream comprises water, an alkanolamine, and optionally a minor amount in mol percent of a diprimary aliphatic glycol or polyol; wherein said molded foam exhibits a ball rebound of less than about 65%.

12. In a vehicular seat having a seating cushion prepared by reacting an isocyanate component with an isocyanate reactive component in a closed mold, the improvement comprising:

a) selecting as at least a major portion of said isocyanate component, an isocyanate-terminated low intrinsic unsaturation prepolymer prepared by the reaction of a stoichiometric excess of one or more di- or polyisocyanates with a polyol component having an average intrinsic unsaturation of less than 0.025 meq/g and comprising in major part one or more di- or higher functionality low intrinsic unsaturation substantially polyoxypropylene polyols having an unsaturation less than 0.025 meq/g and an equivalent weight greater than 1000 Da;

and selecting as the major portion in mol of an isocyanate reactive component comprising:

b) an activator stream comprising water and optionally a low molecular weight amine or alkanolamine;

wherein said seating cushion exhibits a ball rebound of less than 70%, a resonance frequency of about 7 Hz or less, and a density of about 4 lb/ft$^3$ or less.

13. The vehicular seat of claim 1 wherein said seating cushion exhibits a ball rebound of less than about 65%.

14. The vehicular seat of claim 1 wherein said seating cushion exhibits a ball rebound of from about 50% to 60%.

15. The vehicular seat of claim 12 wherein said seat is a deep foam seat devoid of spring suspension.

16. A process for the preparation of polyurethane molded foam having a resonant frequency of about 7 Hz or less, a ball rebound of less than 70%, a density of about 4 lb/ft$^3$ or less, and suitable for dynamic seating applications, said process comprising reacting in a closed mold, a polyurethane/urea forming composition comprising:

a) an isocyanate-terminated low intrinsic unsaturation prepolymer prepared by the reaction of a stoichiometric excess of one or more di- or polyisocyanates with a polyol component having an average intrinsic unsaturation of less than 0.025 meq/g and comprising in major part one or more di- or higher functionality low intrinsic unsaturation substantially polyoxypropylene polyols having an unsaturation less than 0.025 meq/g and an equivalent weight greater than 1000 Da;

with b) an activator stream comprising water and optionally a low molecular weight amine or alkanol amine;

optionally in the presence of c) an effective amount of one or more catalysts which promote the reaction between a) and b).

17. The process of claim 16 wherein said polyol component comprises in excess of 80% by weight of one or more low intrinsic unsaturation polyols having an unsaturation of about 0.015 meq/g or less.

18. The process of claim 16 wherein said foam ball rebound is less than about 65%.

19. The process of claim 18 wherein said foam ball rebound is in the range of 50% to 60%.

20. The process of claim 16 wherein said polyol component comprises minimally about 80% by weight of one or more ultra-low intrinsic unsaturation polyoxypropylene polyols containing not more than about 30 weight percent oxyethylene moieties and ultra-low intrinsic unsaturation polymer polyols, said polyoxypropylene polyols and said polymer polyols having an intrinsic unsaturation of less than about 0.010 meq/g, and wherein said blowing/chain extending stream comprises water and an alkanolamine.

21. In a process for the manufacture of molded polyurethane foam by reaction of an isocyanate-terminated prepolymer with a water stream, the improvement comprising:

supplying to a mix head, four reactive streams, said four reactive streams comprising:

a) a first, activator stream comprising a major molar proportion of water;

b) a second, isocyanate stream, comprising one or more organic di- or polyisocyanates;

c) a third, low solids prepolymer stream comprising one or more isocyanate-terminated prepolymers, said prepolymers together having a dispersed phase polymer solids content of from 0 weight percent to about 10 weight percent based on the weight of the polyols contained in said prepolymer(s) of said low solids prepolymer stream;

d) a fourth, high solids prepolymer stream comprising one or more isocyanate-terminated prepolymers, said fourth stream containing from about 15 weight percent to about 60 weight percent of dispersed phase polymer solids based on the weight of the polyols contained in said high solids prepolymer stream;

introducing a portion of said first, activator stream, and at least two of said second, third, and fourth streams into said mix head;

mixing said streams in said mixhead to form a reactive polyurethane foam mixture;

introducing said reactive polyurethane foam mixture into a mold; and recovering from said mold a polyurethane foam.

22. The process of claim 21 wherein all polyols in the prepolymers of said low solids prepolymer stream and the prepolymers of said high solids prepolymer stream having equivalent weights of greater than 1000 Da are low intrinsic unsaturation polyols.

23. The process of claim 21 wherein foam physiochemical properties are altered by varying the ratio of one or more of streams a) through d) without varying the compositional make-up of any single stream.

24. The process of claim 21 wherein following reaction of streams a) through d) to form a polyurethane/urea foam and curing said foam, the cured foam exhibits a resonant frequency of less than 7 Hz and a ball rebound of less than 70.

25. A process for the preparation of two or more molded polyurethane foams having different physicochemical properties from a single mixhead, said process comprising:

1) supplying to a mixhead
   a) one or more activator streams
      a)i) a first activator stream comprising a major molar proportion of water, and
      a)ii) an alternative first activator stream different from said first activator stream and comprising a major molar proportion of water,
   said one or more activator streams supplying to said mixhead at least one polyurethane catalyst;
   b) two or more isocyanate-functional streams
      b)i) a second, isocyanate stream comprising one or more organic di- or polyisocyanates;
      b)ii) a third, low solids prepolymer stream comprising one or more isocyanate-terminated prepolymers, said prepolymers together having a dispersed phase polymer solids content of from 0 weight percent to about 10 weight percent based on the weight of the polyols contained in said prepolymer(s) of said low solids prepolymer stream;
      b)iii) a fourth, high solids prepolymer stream comprising one or more isocyanate-terminated prepolymers, said fourth stream containing from about 15 weight percent to about 60 weight percent of dispersed phase polymer solids based on the weight of the polyols contained in said high solids prepolymer stream;
   at least one of said two or more isocyanate-reactive streams being selected from b)ii) or b)iii);

2) mixing in said mixhead a portion of an activator stream derived from a)i), a)ii) or both a)i) and a)ii) and one or more isocyanate reactive stream(s) b)i), b)ii), or b)iii, wherein at least one of said one or more isocyanate reactive stream(s) is a prepolymer-containing stream b)ii) or b)iii), to form a reactive polyurethane foam mixture;

3) introducing said reactive polyurethane foam mixture into a mold; and 4) recovering from said mold a first molded polyurethane foam having a first set of physicochemical properties; and 5) altering the relative proportions of streams a)i), a)ii), b)i), b)ii), and b)iii) mixed in said mixhead in step 2) without altering the supply of streams a)i) through b)iii) supplied in step 1) and repeating steps 2 through 4 to recover a second molded polyurethane foam having physicochemical properties different from said first molded polyurethane foam.

* * * * *